United States Patent [19]

Courvoisier et al.

[11] 4,083,360

[45] Apr. 11, 1978

[54] DEVICE FOR COLLECTING SOLAR ENERGY

[75] Inventors: Jean-Claude F. Courvoisier; Jean-Luc CH. Meylan, both of Geneva, Switzerland

[73] Assignee: Battelle Memorial Institute, Carouge-Geneva, Switzerland

[21] Appl. No.: 661,827

[22] Filed: Feb. 26, 1976

[30] Foreign Application Priority Data

Feb. 28, 1975 Switzerland .................. 2559/75

[51] Int. Cl.² .............................................. F24J 3/02
[52] U.S. Cl. ..................................... 126/271; 126/270; 237/1 A
[58] Field of Search ............... 126/270, 271; 237/1 A; 165/48, 49; 136/89

[56] References Cited

U.S. PATENT DOCUMENTS

| 2,469,496 | 5/1949 | Christenson | 126/271 |
| 2,601,905 | 7/1952 | Anderegg | 126/270 |
| 2,671,441 | 3/1954 | Harris | 126/270 |
| 3,937,208 | 2/1976 | Katz | 126/271 |

FOREIGN PATENT DOCUMENTS

| 1,900,069 | 9/1970 | Germany | 126/271 |
| 2,309,307 | 8/1974 | Germany | 126/271 |
| 282,024 | 7/1952 | Switzerland | 126/271 |

Primary Examiner—Kenneth W. Sprague
Assistant Examiner—James C. Yeung
Attorney, Agent, or Firm—Karl F. Ross

[57] ABSTRACT

A device for collecting solar energy, for incorporation in a dwelling, especially in a tiled roof, comprises a heat-absorbing plate, ducting for a heat-exchange fluid for extracting heat from the plate, and single or double glazing over the plate, this glazing consisting of a plurality of radiation - transmitting tiles each having a recessed rear face defining a cell, whereby convection between the glazing and the absorbing surface is reduced or eliminated.

11 Claims, 19 Drawing Figures

DEVICE FOR COLLECTING SOLAR ENERGY

The ever-increasing rise in energy consumption throughout the world and the existing tendency in industrialized countries to diversify energy sources justify renewed interest in solar energy. Although it seems doubtful whether solar energy will be able to supplant other energy sources in the near future, it appears nevertheless almost certain that solar energy could in the coming years play a particularly important role in a number of fields, particularly with regard to domestic heating and air conditioning.

Devices for collecting solar energy to heat houses and/or water for washing are already known. Such devices generally comprise panes of glass located on an absorbing surface which becomes heated under the action of solar radiation retained by the "greenhouse" effect, and transfers the heat thus absorbed to a fluid flowing through pipes placed in contact therewith. The whole system is generally mounted on a frame arranged to ensure mechanical stiffness and sealing. Such a frame has to be able to withstand sometimes severe weather conditions (rain, humidity, frost) and repeated thermal cycles, which increases the production cost of the devices. Moreover, the efficiency of such devices remains limited notwithstanding the use of heat-insulating materials covering the rear faces and the side walls of the devices, owing to unavoidable heat losses by radiation and convection.

To reduce losses by radiation and convection, it has been suggested to use double glazing, which assists in improving heat insulation without causing too many losses by absorption and reflection at the glass, or transparent or reflecting walls arranged perpendicularly to the absorbing surface between the latter surface and the glass. Such additional arrangements, however, besides complicating the device, increase production costs.

It has also been suggested to subject the absorbing surface to various treatments to reduce its heat-emission coefficient in the infrared region of the spectrum without affecting its heat-absorption coefficient for the solar spectrum. However, the cost of such treatments is considerable and is justified only in particular cases.

Moreover, solar heating devices are difficult to integrate in houses since they have poor compatibility with normal aesthetic requirements. This integration difficulty also reduces the effectiveness of standardization of the devices, owing to the large architectural differences to be found in building construction. On the other hand, standardization is an essential factor in attaining a substantial decrease in production costs.

An object of the present invention is to provide a modular arrangement permitting good constructional integration in houses.

The present invention provides a device for collecting solar energy, which is designed to be integrated in a dwelling, particularly in the roof thereof, comprising a surface having a great absorption power with respect to solar radiation, means for transferring heat absorbed by the said surface to a heat-conveying fluid flowing in the vicinity thereof, and a plurality of hollow elements consisting of material permeable to the said radiation and disposed on the said surface so as to completely cover it, the hollow part of each of the said elements being arranged facing the said surface, and the said elements being arranged so as to define together with the said surface a plurality of cells to retain the said solar energy by the greenhouse effect.

BRIEF DESCRIPTION OF THE DRAWING

The accompanying drawings diagrammatically show, by way of example, solar heating devices according to the present invention. In the drawing:

FIG. 7 is a cross-sectional view, on a larger scale, illustrating a detail of FIG. 6;

FIG. 14 is a partially perspective view, with parts cut away, illustrating a seventh embodiment;

FIG. 17 is a perspective view, with parts cut away, illustrating a ninth embodiment;

SPECIFIC DESCRIPTION

Figures 1, 3:
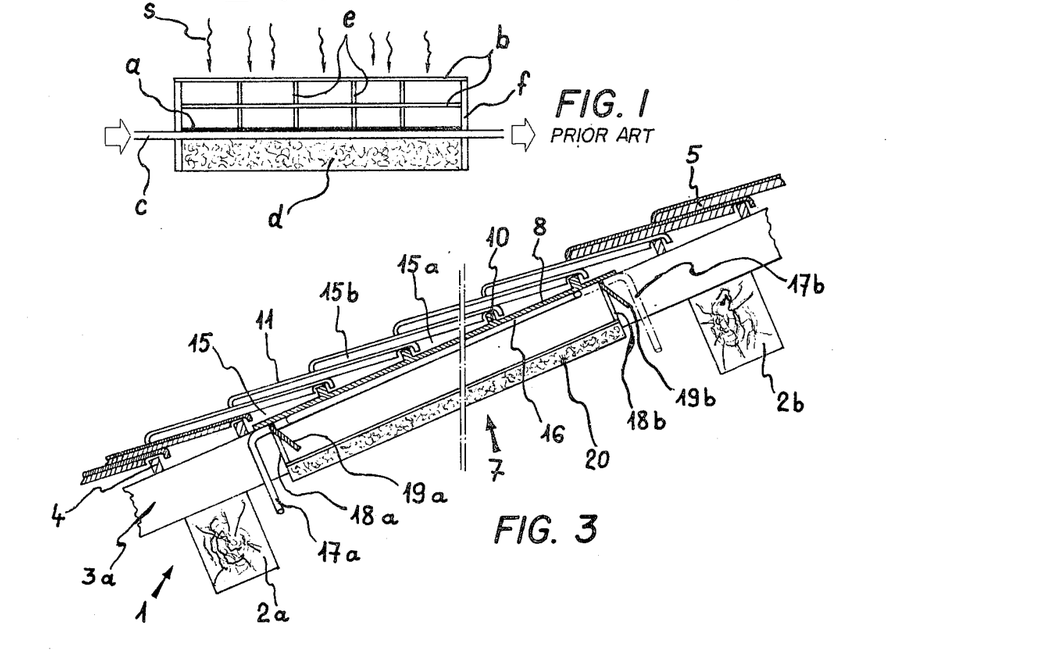
FIG. 1 is a cross-sectional view illustrating a known solar heating device.
FIG. 3 is a cross-sectional view taken along the line III—III of FIG. 2.

FIG. 1 shows a known device for collecting solar energy, which comprises an absorbing surface *a*, double glazing *b* disposed above the absorbing surface *a*, an assembly of pipes *c* conveying water and placed in contact with the rear face of the surface *a*, a heat-insulating material *d*, transparent partitions *e* located between the surface *a* and the glazing *b*, and a frame *f* supporting the assembly. The absorbing surface *a* is heated by solar radiation *s* passing through the double glazing *b*, and transfers heat to the pipes *c* so that water flowing the the pipes is heated.

Figure 2:
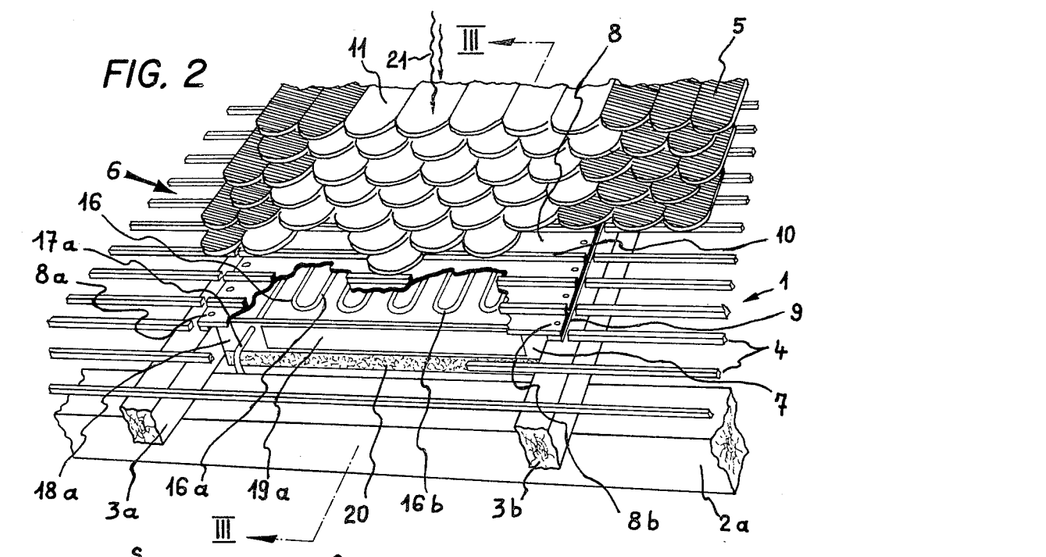
FIG. 2 is a perspective view, with parts cut away, of an embodiment of the invention.

FIGS. 2 to 13 illustrate devices for collecting solar energy according to the invention, designed to be installed in a house, particularly in the roof of the house. In the following description, it is assumed that the roof (which is only partly shown in the drawings) is of a known type, and comprises, for example, as shown in FIGS. 2 and 3, timberwork 1 having horizontal beams or purlins 2, rafters 3 resting on the purlins 2 along lines of maximum slope of the roof, laths 4 disposed at regular intervals across the rafters, and roofing consisting of a multiplicity of ordinary flat tiles 5 (distinguished by shading in FIGS. 2 and 3), such as slate or ceramic tiles, secured to the laths 4. In a particularly advantageous arrangement, a device according to the invention may be inserted in a window 6 cut out in a part of the roofing delimited by two adjacent purlins and two adjacent rafters (for example the purlins 2a and 2b and the rafters 3a and 3b in FIGS. 2 and 3). In the following description, reference will be made to this particular arrangement.

The device for collecting solar energy shown in FIGS. 2 to 5 comprises a thin parallelepipedal case 7 which substantially occludes the whole window 6 and rests by means of flanges 8a and 8b extending from its top wall 8 over the adjacent rafters 3a and 3b (FIG. 2). Straps 9 consisting of a heat-insulating material are placed between the rafters 3a and 3b and the flanges 8a and 8b respectively. The top wall or plate 8 of the case 7 preferably consists of a metal plate. The outer face of the plate 8 is coated with a layer of a material having a high absorption coefficient for solar radiation. Bars 10 are provided on the absorbing plate 8 at regular intervals, e.g. by welding, and extend, normally to lines of maximum slope of the roof, from the flange 8a to the flange 8b of the plate 8 so as to form continuations of the laths 4 terminating at the window 6.

A plurality of hollow elements or tiles 11 consisting of a material transparent to solar radiation, such as glass or transparent plastics material, are located on the absorbing plate 8 so as to cover its entire surface. Each hollow element 11 has (FIGS. 4 and 5) a top flat face 12 of rectangular shape which terminates with a round end 12a, and a depending side wall 13 surrounding the top face 12 and having two notches 14a and 14b opposite to one another and formed in its straight side parts at the ends thereof adjacent to the straight end part 13a opposite to the round end 12a; the distance between the end part 13a, which forms a heel; and the end of the round part 12a is substantiallly equal to twice the distance between the bars 10, and is thus twice the distance between the laths 4. The hollow elements 11 are anchored to the bars 10 of the absorbing plate 8 so that all the elements 11 attached to the same bar 10, i.e. all the elements 11 in the same row, are in contact side by side; the elements 11 in a horizontal row overlap substantially half the length of the elements in the next lower row and have half their length covered by the elements in the adjacent upper row, the elements of each row being laterally staggered with respect to those in the adjacent rows.

The assembly formed by the follow elements 11, together with the absorbing plate 8, defines a plurality of cells 15 disposed in such a way that solar radiation striking the elements 11 at any angle of incidence has to pass through two superimposed cells 15 before reaching the absorbing plate 8. The sizes of the hollow transparent elements 11 are chosen so as to be compatible with those of the ordinary flat tiles 5 covering the remainder of the roof so that there is no transition problem between the edges of the energy-absorbing device and the conventional tiles 5.

A pipe 16 is located inside the case 7 and welded to the inner face of the absorbing plate 8 (as shown in FIGS. 2 and 3). The pipe 16 is serpentine, with a plurality of straight parts 16a which extend parallel to a line of maximum slope of the roof, are connected to each other by bent parts 16b, and terminate, at one end 17a thereof, at the lower side wall 18a of the case 7 facing the lower purlin 2a, and, at the other end 17b, at the upper side wall 18b of the case 7 facing the upper purlin 2b. The lower and the upper side walls 18a and 18b are also provided with shutters 19a and 19b which form a major part of these side walls. The shutters 19a and 19b can be manually operated (by means of a mechanism not shown) so that the case 7 may be placed in communication with the external atmosphere. A layer 20 of a heat-insulating material covers the rear face of the case 7.

It will be seen that the above-described device can be perfectly integrated in the roofing of a house. Such integration is made possible by the conception of the device and the compatibility of the hollow transparent tiles 11 with conventional tiles 5. By way of example, it is possible to use conventional tiles of about 30 to 35 cm in length, about 15 to 20 cm in width and of about 15 to 25 mm thickness, and hollow tiles of glass having practically the same length and width as the conventional tiles, but with a thickness of the glass of about 4 to 10 mm, and internal height of the side wall 13 (i.e. cavity depth) of about 10 to 20 mm.

The bars 10 welded to the outer face of the plate 8 and resting with their ends on the adjacent rafters 3a and 3b by means of the flanges 8a and 8b of the plate, and the pipe 16 welded to the inner face of the plate 8, ensure mechanical stiffness for the whole device.

The above described device is designed to be connected, at the ends 17a and 17b of the pipe 16 through which a fluid such as water or air flows, to a heating system (not shown) in the house, preferably by way of a pumping device (not shown).

The operation of the device described above is similar to that of the above-mentioned conventional devices for collecting solar energy. The shutters 19a and 19b of the case 7 are normally closed so as to keep a certain amount of air inside the case 7. Solar radiation 21, which passes through two successive transparent walls of tiles 11, heats the heat-absorbing plate 8, which transfers part of its heat to the pipe 16 in contact with it so that the temperature of the fluid inside the pipe 16 is progressively increased. The heated fluid is then caused, either by natural convection, or by forced convection (pumping action), to flow outwards so as to transfer heat to the heating system (for space heating and/or for heating water) in the house. A thermal equilibrium is eventually attained within the device, which is then at a definite equilibrium temperature, which is higher the more intense the solar radiation is, the smaller the rate of flow of fluid to the exterior, and the lower the heat losses.

Heat losses (i.e. that part of the solar energy absorbed by the plate and not transferred to the fluid by conduction) are reduced to a minimum. In fact, heat losses rearwards of the device are negligible owing to the air held in the case 7 (which air is an excellent insulator) and the presence of the insulating material 20. In order to further reduce heat losses rearwards, the inner face of the rear wall of the case 7 may be covered with a reflecting layer. Moreover, heat losses from the front of the device (losses by conduction, convection, and radiation) are reduced to a minimum owing to the presence of hollow transparent tiles 11 and their particular disposition, whereby they play the roles of double glazing and of partition walls as in conventional solar energy collectors, which results in convection being eliminated at the front of the device.

Let us further consider heat losses from the front of the device. Losses by conduction are negligible owing to the low heat-conduction coefficient of the material of the transparent tiles 11 (glass or plastics material). Losses by radiation are also reduced to a low value by the presence of a double layer of transparent tiles 11 (the tiles 11 form, owing to the well known "greenhouse" effect, absorbing surfaces for the radiation reflected or emitted outwards by the plate 8), whereby only a quarter of the radiation energy leaving the plate 8 actually reaches the exterior of the device. Finally, losses by convection are prevented by the imbrication of the transparent tiles 11 which form a plurality of cells 15 separated from each other. Owing to the inclination of the cells 5 according to the slope of the roofing, the possibility of convection taking place even within each of the cells 15 is strongly reduced, since hot air is confined to the upper part 15a in each cell 15 (see FIG. 2), i.e. it is in contact with the hot plate 8, whereas cold air is confined to the lower part 15b of the cell, which is the only part in direct contact with the exterior. Accordingly, the air is subject only to very local convection movements inside the cells. On the other hand, the air in each cell ensures excellent heat insulation.

It is thus possible, depending upon the incident solar radiation and the flow rate of the fluid, to attain relatively high equilibrium temperatures. It is even possible that, particularly during summer when solar radiation is very intense and domestic need for energy is relatively small, the equilibrium temperature may be so high that the collector has to be cooled to avoid overheating of the roof: if suitable measures are not taken, the temperature could rise to 130° C - 140° C. In such circumstances the shutters 19a and 19b can be opened, thereby placing the interior of case 7 in communication with the atmosphere so that hot air leaves from the top of the case 7 and is replaced by fresh air drawn through the base of the case by convection. It is thus possible to reduce at will the heat insulation of the collector by causing heat losses by convection, thereby obtaining lower equilibrium temperatures. Hot air may be either freely discharged underneath the ridge of the roof, the hot air remaining there, or directly above the roof by means of an outlet duct, or possibly through a chimney (not shown in the drawing) to increase the convection current. The outlet duct and the chimney may be of any cross-section, even a variable cross-section. The area of their cross-section must, however, remain unchanged and substantially equal to that of the air inlet and outlet orifices of the case 7.

In order to prevent solar radiation from being reflected by the roofing, which is not desirable from the aesthetical viewpoint, tiles 11 of slightly roughened, e.g. ground, glass may be used; this has practically no effect on the properties of the solar energy collector. It is also possible to color the outer face of the absorbing plate 8, e.g. red-brown, so that the collector has a visual aspect similar to that of ordinary tiles.

Figures 4, 5, 6:
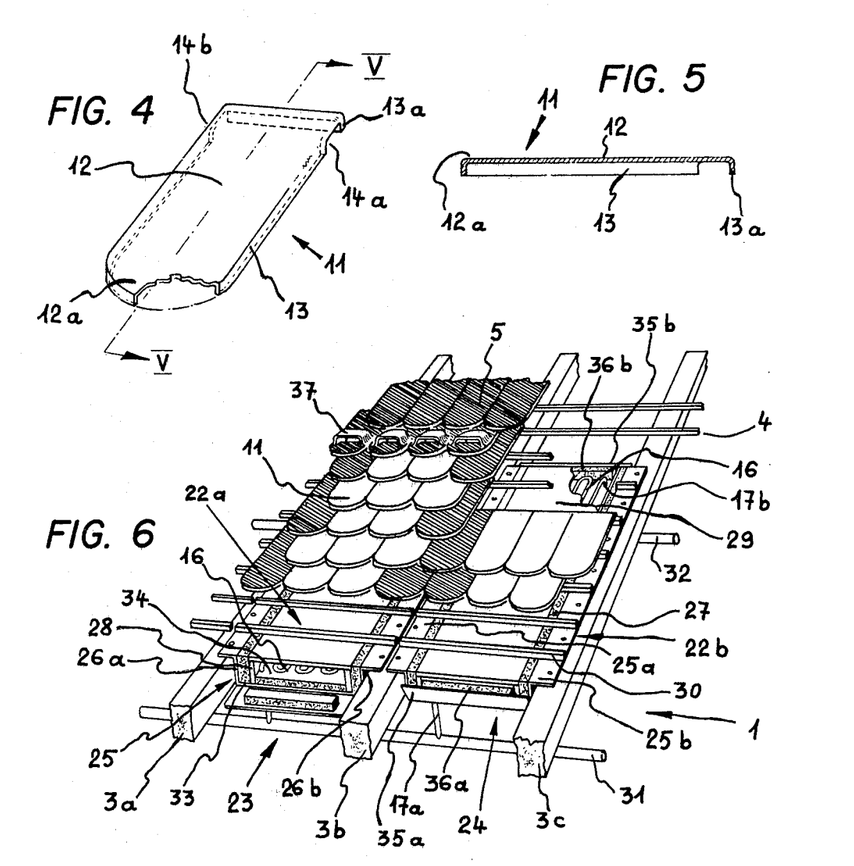
FIG. 4 is a view illustrating a detail of FIG. 2 on a larger scale.
FIG. 5 is a cross-sectional view taken along the line V—V of FIG. 4.
FIG. 6 is a perspective view, with parts cut away, illustrating a second embodiment of the invention.
Figure 7:
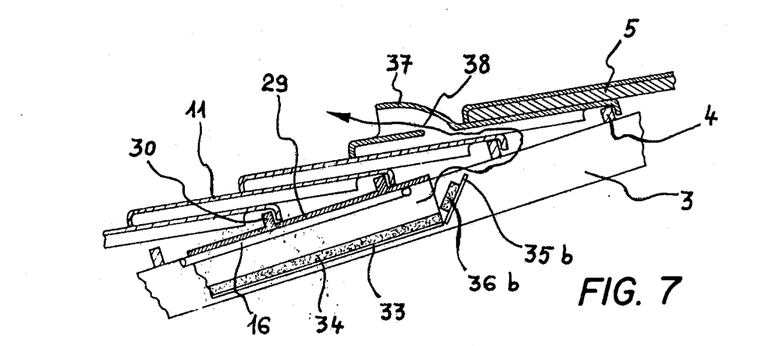

The variant shown in FIGS. 6 and 7 comprises two devices 22a and 22b for collecting solar energy which are identical with one another, are mounted side by side in the roof, and are connected in parallel to an inlet pipe 31 for cold fluid and an outlet pipe 32 for hot fluid. Each of these collectors differs from that shown in FIGS. 2 and 3 in the way it is insulated from and connected to the roofing and in the way cooling air is extracted. In FIGS. 6 and 7, the components corresponding to those shown in FIGS. 2 to 5 are indicated by the same reference numbers and letters.

The two collecting devices 22a and 22b are respectively mounted in two adjacent windows 23 and 24, the window 23 being delimited by the rafters 3a and 3b, and the window 24 by the rafters 3b and 3c.

Since the two devices 22a and 22b are identical with one another, the constituent elements thereof have been indicated by the same reference numbers in FIGS. 6 and 7. Each of these devices 22a and 22b comprises a case 25 of parallelepiped shape which occupies substantially the whole of its window, and rests with its flanges 25a and 25b on the adjoining rafters 3a and 3b or 3b and 3c. The width and the height of the cases 25 are chosen so as to be substantially equal respectively to the distance between the rafters 3 and to the thickness thereof. Strips 27 consisting of a good heat-insulating material are disposed against the inner side walls 26a and 26b of each case 25. Heat insulating stays 28 consisting for example of eternit bear against the strips 27 and are arranged to carry a metal plate 29 whose upper face is covered by a material with a great heat-absorption coefficient for solar radiation. Bars 30 are disposed underneath the cases 25 and rest, in turn, on the flanges 25a and 25b of the cases 25 and on the absorbing plates 29, while extending from one side to the other of the respective windows 23 and 24 so as to be arranged in alignment with the laths 4. Hollow transparent tiles 11 are anchored to the bars 30 so as to completely cover the absorbing plates 29. Directly above the middle rafter 3b, as well as on the remainder of the roof, there are disposed conventional flat tiles 5 (indicating by hatching) which are compatible in shape and size with the hollow transparent tiles 11 and are arranged with respect to the latter so as to form a uniform roof, the tiles being staggered with respect to each other similarly to the previously described embodiment. Serpentine pipes 16 are placed in contact with the inner face of each absorbing plate 29, and are respectively connected, at one end 17a, to the fluid inlet pipe 31 horizontally extending close to the lower ends of the cases 25, and at ends 17b to the outlet pipe 32 extending horizontally close to the upper ends of the cases. Furthermore, the bottom wall 33 of each case 25, through which the respective ends 17a and 17b of the pipes 16 pass, is covered by a plate or layer 34 consisting of a good heat-insulating material such as rock wool, which extends throughout the bottom wall 33 from one stay 28 to the other. The bottom end of each of the cases 25 is closed by a shutter 35a extending throughout the width of the case 25 and articulated to the lower edge of the bottom wall 33 of the case 25 so as to be able to be opened towards the exterior (by means of a mechanism not shown). A pad 36a of insulating material is fixed to the inner face of each shutter 35a. Similarly, the top end of each case 25 is closed by a shutter 35b (FIG. 7) bearing on its inner face a pad 36b of insulating material and articulated to the top edge of the bottom wall 33 of the case so as to be able to be opened towards the exterior (by means of a mechanism not shown), thereby placing the top end of the case 25 in communication with the space underneath ventilation tiles 37 anchored directly above the top edge of the absorbing plates 29. Hot air in the cases 25 may thus be extracted therefrom directly to the ventilation tiles 37 (outflow shown by an arrow 38 in FIG. 7) upon opening of the shutters 35a and 35b, in order to create a convection cooling flow as described above.

The operation of this variant is the same as that of the embodiment shown in FIGS. 2 to 5. The presence of the strips 26a and 26b of heat insulating material, as well as the disposition of conventional tiles 5, opaque to light, straight above the rafters 3, particularly the rafter 3b have the object of thermally insulating the timberwork 1 from the heated absorbing plates 29.

Figure 8:
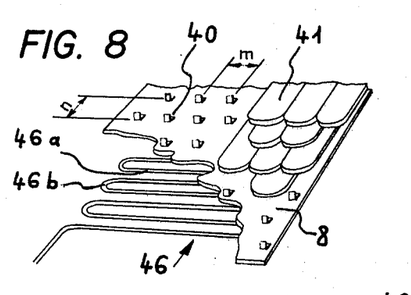
FIG. 8 is a partial view illustrating a third embodiment of the invention.
Figure 9:
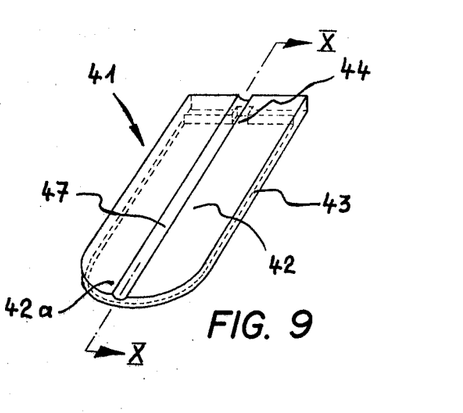
FIG. 9 is a view illustrating a detail, on a larger scale, of FIG. 8.
Figure 10:
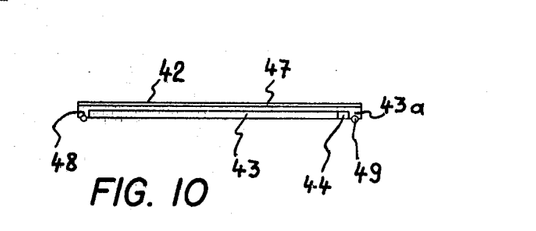
FIG. 10 is a cross-sectional view taken along the line X—X of FIG. 9.
Figure 11:
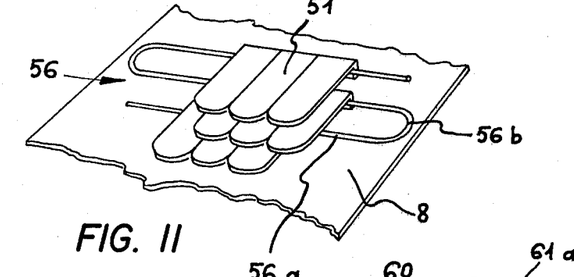
FIG. 11 is a partial view, similar to FIG. 8, illustrating a fourth embodiment of the invention.
Figure 12:
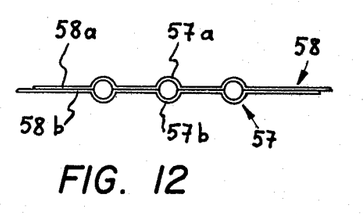
FIG. 12 is a partial view illustrating a fifth embodiment.
Figure 13:
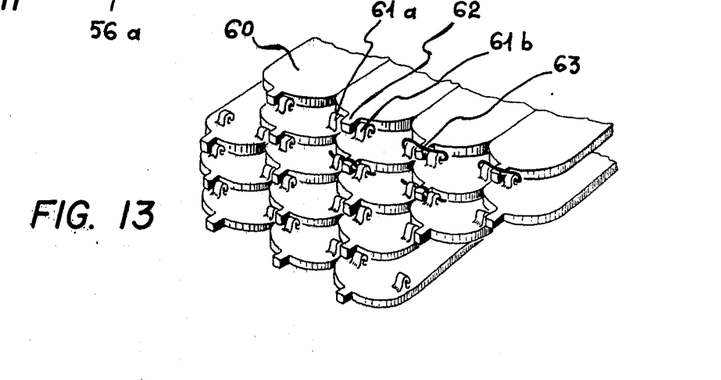
FIG. 13 is a partial view illustrating a sixth embodiment.

The embodiment partly shown in FIGS. 8 to 10 differs from the previous embodiments in the way of anchoring the transparent tiles to the absorbing plate and to the disposition of the piping for heat exchange. Instead of longitudinal bars, to anchor the tiles, a plurality of hooks 40 spaced from each other are disposed on the absorbing plate 8 in successive rows so that the horizontal distance "m" between two adjacent hooks in the same row is equal to the width of a tile and the distance "n" between two adjacent rows of hooks is equal to the distance between the laths of the timberwork, the hooks in a row being staggered horizontally with respect to those in the adjacent rows. A plurality of transparent tiles 41, imbricated with each other in a way similar to that previously described, are anchored to the absorbing plate 8 by means of the hooks 40.

Each tile 41 comprises (FIGS. 9 and 10) and upper plane face 42 of rectangular shape which terminates with a round end 42a, and a depending side wall 43 at the periphery of the upper face 42. The inner face of the wall 43 is formed, in the straight part 43a thereof opposite the round end 42a of the tile, with a recess 44 designed to receive a hook 40, to ensure accurate positioning of the tile 41 with respect to the hook. The upper face 42 of the tile 41 has a central groove 47 extending throughout the length of the tile. The groove 47 is designed, for example, to assist drainage of rain water along the slope of the roof. An annular seat 48 is formed in the lower face of the wall 43 to receive a seal 49 consisting, for example, of asbestos plait. The object of the seal 49 is to ensure sealing between overlapping tiles and between the top edge of a tile and the collector. As a modification, it is possible to locate seals in the outer faces of the side walls 43 so as to ensure sealing between adjacent tiles.

Underneath and in contact with the absorbing plate 8, there is serpentine piping 46 similar to that described above except that its straight parts 46a extend normally to a line of maximum inclination of the roofing, horizontally, instead of being arranged parallel to such a line as in the previously described embodiments.

In the embodiments so far described, the piping is located underneath the energy-absorbing plate. However, this disposition is not essential. Thus in FIG. 11, the piping 56 is in contact with the upper face of the absorbing plate 8, the straight horizontal parts 56a of the piping serving simultaneously as anchoring means for the transparent tiles 51. In the variant shown in FIG. 12 a pipe 57 is incorporated in the body of a plate 58 obtained by placing together two half-plates 58a and 58b in which respective half-pipes 57a and 57b have been formed for example by pressing or stamping.

Advantageously, the tiles can have projections so as to be secured to each other e.g. by means of a wire. It is also possible to use a securing arrangement such as that shown in FIG. 13, in which each tile 60 has two lugs 61a and 61b located close to respective edges of the tile and projecting from the upper face of the tile near the middle of the length thereof, and a tongue 62 which forms an extension of the front end of the tile, the said lugs and tongue being so arranged that the tongue 62 of a tile in any one row is inserted between the lugs 61a and 61b of two adjacent tiles in the next lower row. A length of wire 63 pivotably mounted at its ends in the lugs 61a and 61b is then pushed over the tongue 62 so as to hold the tiles in position.

The fixing arrangement just described, or a similar one, could be particularly advantageous in the case where the collector is mounted in a steeply pitched roof, or where the collector is vertically mounted on a wall. It is to be understood that the solar energy-collecting device according to the invention is not limited to roof installation.

Figure 14:
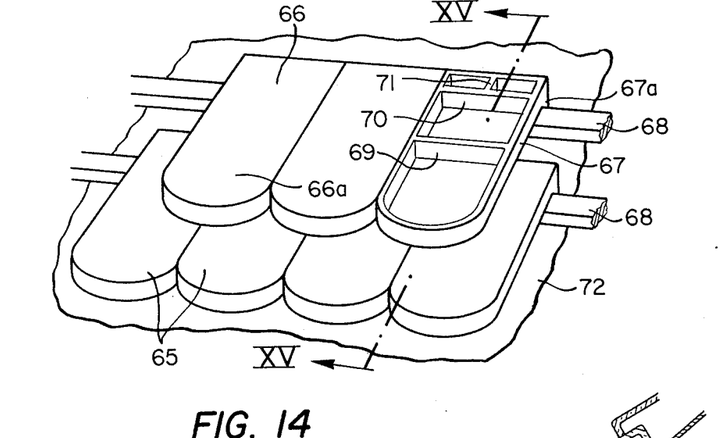
Figure 15:
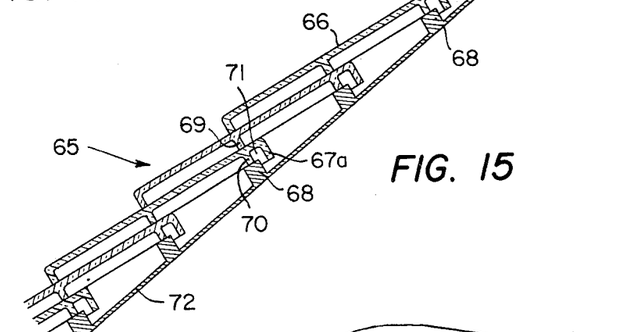
FIG. 15 is a cross-sectional view taken along the line XV—XV of FIG. 14.

FIGS. 14 and 15 show hollow transparent tiles 65 each having an upper plane face 66 of rectangular shape terminating with a round end 66a, and a depending side wall 67 which surrounds the upper face 66. The straight end part 67a of the side wall 67 opposite the round end 66a has a greater height than the remainder of the wall 67; it acts as a "heel" for the tile, to anchor the tiles 65 to angle bars or ribs 68 carried by an energy-absorbing surface 72. The tile 65 also has two transverse ribs 69 and 70 extending from one side to the other of the tile 65, viz. a first transverse rib 69 located substantially in the middle of the tile, and a second transverse rib 70 located near the straight part 67a, the rib 70 and the straight part 67a being also connected substantially at the middle thereof by a rib 71. The function of the ribs is to improve both the mechanical strength of the single tiles 65 and the solidity of the covering of the energy collector constituted by the assembly of tiles 65, thus making easier for a tiler to work on the roof. The ribs 69 and 70 are arranged in such a manner that, when the tiles 65 are anchored to the bars 68, the second rib 70 of any tile rests directly on the bar 68, while the first rib 69 of the tile rests on a tile of the next lower row directly above the anchoring bar for the latter row. Moreover, the ribs 69 and 70 also assist in reducing convection movements of the air between the tiles 65 and the surface 72 of the energy-absorbing plate: the rib 69 divides the tile 65 into two half-cells, and the rib 70 prevents air between the heel 67a and the bars 68 from flowing in the longitudinal direction.

Figure 16:
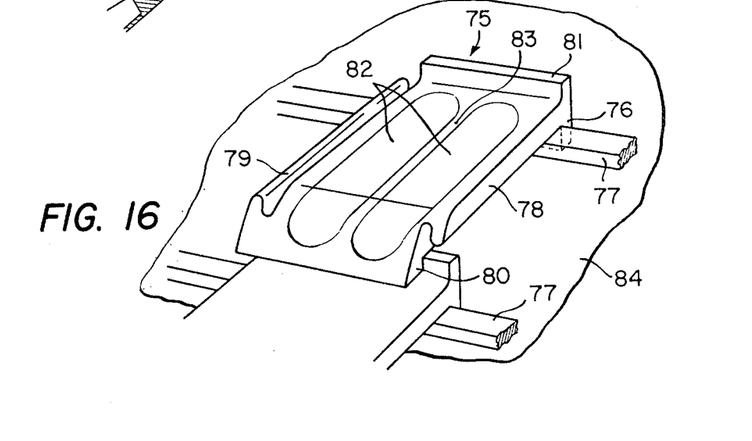
FIG. 16 is a partial perspective view illustrating an eighth embodiment.

The hollow transparent tiles described above so far are all tiles of flat type, i.e. tiles designed to be compatible with plain tiles mounted so as to overlap each other. However other types of tile are used for covering roofs, in particular so-called "mechanical" tiles which are laid side by side, overlapping at their sides only in narrow interengaging regions. FIG. 16 illustrates a hollow transparent tile 75 designed to be compatible with conventional "mechanical" tiles. The tile 75 consists of a transparent material and is substantially identical in shape to a "mechanical" tile, i.e. it comprises a heel 76 for engagement with horizontal bars 77 on an energy-absorbing plate 84, a male edge 78 and a female edge 79 located at respective sides of the tile and arranged to permit engagement with the adjacent tiles in the same row, and front and rear transverse flanges 80 and 81 respectively arranged to engage the adjacent tiles in the next lower and upper rows. The shape of the transparent tile 75 is distinguished from a conventional tile by the presence of two longitudinal recesses 82 formed in the underside of the tile 75 (such recesses are visible in FIG. 16 owing to the transparency of the tile) and separated from one another by a longitudinal rib 83. The longitudinal recesses 82 form cells designed to retain solar energy by the greenhouse effect in a way similar to that of the tiles described above. The transparent tiles 75 are assembled together without overlapping, and thus there is no double glazing and there are not two rows of superimposed cells, so that the thermal efficiency of such an assembly is less satisfactory. On the other hand, lower thermal efficiency is compensated for by the simplicity of the device.

Figure 17:
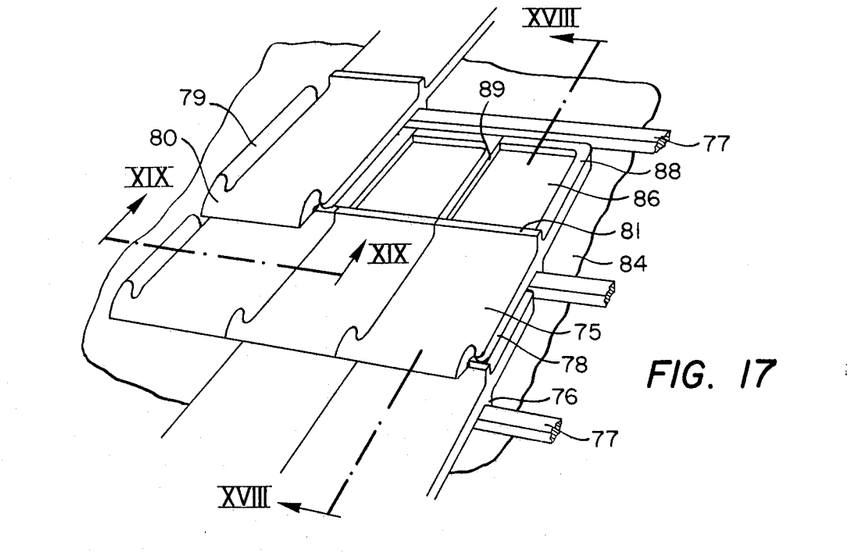
Figures 18, 19:
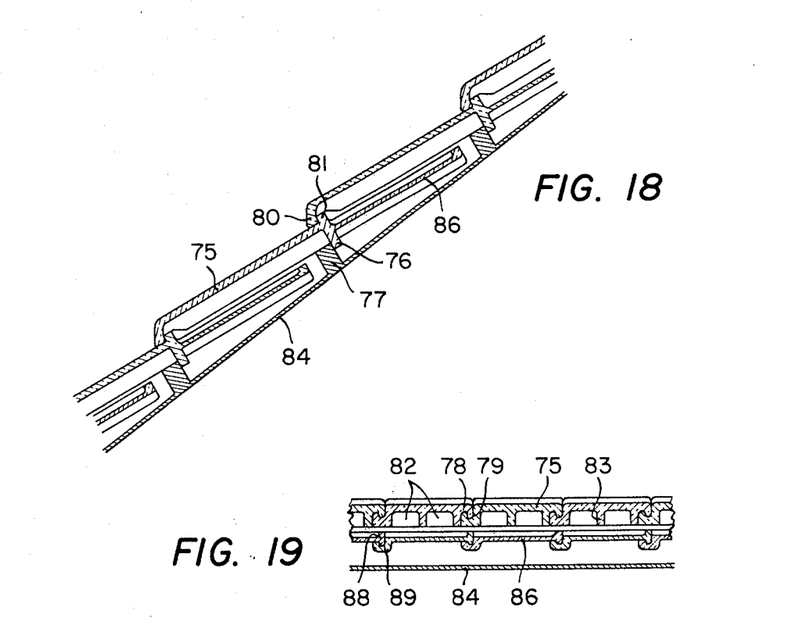
FIG. 18 is a longitudinal cross-sectional view taken along the line XVIII—XVIII of FIG. 17.
FIG. 19 is a transverse cross-sectional view taken along the axis XIX—XIX of FIG. 17.

It is possible, however, to form double glazing with transparent tiles compatible with "mechanical" tiles, by prolonging the tiles 75 by means of a rear part 86 also consisting of a transparent material, as illustrated in FIGS. 17 to 19, which show a plurality of tiles 75 mounted adjacent to each other, each of these tiles 75 having a plain rear part 86 (whose length is slightly shorter than the distance between two adjacent bars 77). The rear part 86 also has a male edge 88 and a female edge 89 at respective sides to permit inter-engagement of the rear parts of the adjacent tiles in a row. In the cross-sectional view of FIG. 19, the rear parts 86 shown belong to a lower row of tiles, while the front parts marked 75 belong to the next upper. Since the rear parts 86 have no mechanical role but simply an optical and thermal role, they may consist of a glass much thinner than the front parts which are load-bearing parts.

The hollow transparent tiles can have a wide variety of shapes. For example, they can be rectangular or square, and may terminate with a round part, or not. Their front face may also have one or more orifices designed to facilitate evacuation of condensation water, whereas their upper face may be grooved or of ground glass. The tiles may be so shaped as to focus, at least partly, solar radiation onto the absorbing plate. Advantageously, the thickness of the upper face of tile may be 2 to 15 mm, while the depth of the recesses in the tile may be 0.5 to 3 cm. Moreover depending upon their shape, the tiles may be arranged staggered with each other or in line.

It is also possible, for aesthetic purposes, to partially or totally color the transparent tiles, particularly their vertical portions (supporting rims, stiffening ribs), the colouring being either superficial or in the tile material. Partial coloration has the object of giving viewers the impression that (the direction of observation in general differing from the angle of incidence of the solar radiation) the tiles are fully colored, while impairing as little as possible the transparency of the tiles with respect to solar radiation.

Advantageously, the energy-collecting device according to the invention can be mounted in series or in parallel with other similar devices in order to increase the power of the installation by enlarging the surface exposed to solar radiation.

It is also possible to use larger absorbing surfaces and to mount them in the roof by cutting one or more intermediate rafters and by strengthening the supporting rafters. The collector may have a thickness lower than or substantially equal to that of the rafters; such an arrangement could, for example, permit installation of collectors extending throughout the slope of the roof, the purlins not being an obstacle to such an installation.

The device according to the invention has many advantages compared with conventional collectors. The modular conception of the device, by its compatibility, permits complete integration thereof with practically any constructional style, with no need for changes in the conventional building techniques. Such a device may be mounted in new houses while the same are being built, or in already existing houses. Such possibility of integration thus permits great aesthetic improvements as well as considerable simplification in the assembly since the transparent tiles act both as a roof covering end as glazing or double glazing for the energy collector. The modular conception also assists in lowering the production costs considerably, by permitting mass production; in particular, the cost of the transparent tiles may be considerably cut by mass production. The integration of such a device also assists installation of large absorbing surfaces which results in less stringent requirements as far as thermal efficiency per unit area is concerned. Finally, maintenance of such a device is particularly simple, by virtue of easy replacement of the tiles, and access to the collector and the heat exchange piping through the loft.

We claim:

1. A solar-energy collector adapted to be mounted in and to form part of a building structure, comprising:
   a solar-energy absorbing plate;
   conduit means running along said plate for passing a heat-carrying fluid in heat-exchanging relationship with said plate, said plate having a face turned toward the sun;
   an array of formations projecting outwardly from said face of said plate turned toward the sun;
   a multiplicity of flat hollow elements; and
   means on each said element to hook onto said formations so that said elements cover said plate on the side thereof turned toward the sun while lying in side-by-side relation to one another, said elements having surfaces defining with said plate respective cells limiting the circulation of air in the region of said plate and confining heat by the greenhouse effect, said elements being transparent to solar radiation.

2. The solar energy collector defined in claim 1 wherein said elements are disposed in successive rows on said plate.

3. The solar collector defined in claim 2 wherein the elements of each of said rows overlap the elements of an adjacent row and said elements are imbricated such that radiation onto said plate and radiation from said plate passes through two superposed cells formed by overlapping elements.

4. The solar energy collector defined in claim 3 wherein said elements are disposed in contiguous relation with no overlapping.

5. The solar energy collector defined in claim 4 wherein each of said elements is formed with a rear portion of a material permeable to said radiation and extending beneath an element of an adjacent row so that each rear portion defines a first cell with said plate and the overlying element of the adjacent row defines a second cell such that radiation passing to or from said plate traverses both a first and a second cell at any location.

6. The solar energy collector defined in claim 1 wherein said formations are constituted by respective passes of a pipe fixed to an upper surface of said plate and forming said conduit means.

7. The solar energy collector defined in claim 1, further comprising a casing connected to said plate and enclosing the surface thereof turned away from the sun, and means for insulating said casing.

8. The solar energy collector defined in claim 7, wherein said casing has a lateral wall formed with shutter means actuatable to permit the flow of air through said casing.

9. The solar energy collector defined in claim 1, wherein said elements are formed with joints enabling the sealing of the respective cells from one another.

10. The solar energy collector defined in claim 1 wherein said elements are provided with lateral walls formed with openings enabling the draining of water from said cells.

11. The solar energy collector defined in claim 1 wherein at least part of each of said elements is colored to conform to the coloration of a portion of said structure adjoining the solar energy collector.

* * * * *

Dedication 4,083,360.—*Jean-Claude F. Courvoisier* and *Jean-Luc CH. Meylan*, Geneva, Switzerland. DEVICE FOR COLLECTING SOLAR ENERGY. Patent dated Apr. 11, 1978. Dedication filed Mar. 26, 1984, by the assignee, *Battelle Memorial Institute.*

Hereby dedicates to the People of the United States the entire remaining term of said patent.

*[Official Gazette May 22, 1984.]*